(12) United States Patent
Ramalho et al.

(10) Patent No.: US 10,630,749 B2
(45) Date of Patent: Apr. 21, 2020

(54) TIMELY DELIVERY OF REAL-TIME MEDIA PROBLEM WHEN TCP MUST BE USED

(71) Applicant: Cisco Technology, Inc., San Jose, CA (US)

(72) Inventors: Michael A. Ramalho, Lakewood Ranch, FL (US); Darrin Hobson Simmons, Folsom, CA (US); Michael P. Dimitroff, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 669 days.

(21) Appl. No.: 14/826,509

(22) Filed: Aug. 14, 2015

(65) Prior Publication Data
US 2017/0048296 A1 Feb. 16, 2017

(51) Int. Cl.
*H04L 29/06* (2006.01)
*H04L 1/16* (2006.01)
*H04L 12/26* (2006.01)

(52) U.S. Cl.
CPC ............ *H04L 65/80* (2013.01); *H04L 1/1607* (2013.01); *H04L 43/0835* (2013.01); *H04L 43/0847* (2013.01); *H04L 65/1069* (2013.01)

(58) Field of Classification Search
CPC .................................................... H04L 65/80
USPC ......................................................... 709/228
See application file for complete search history.

(56) References Cited

U.S. PATENT DOCUMENTS

| | | | | |
|---|---|---|---|---|
| 6,098,108 A * | 8/2000 | Sridhar | ................... | H04L 29/06 709/239 |
| 6,976,085 B1 * | 12/2005 | Aviani | ............... | H04L 67/2804 709/232 |
| 7,136,353 B2 * | 11/2006 | Ha | ...................... | H04L 12/5692 370/230 |
| 2005/0025090 A1 * | 2/2005 | Klein | ...................... | H04L 47/10 370/328 |
| 2005/0058131 A1 * | 3/2005 | Samuels | ................. | H04L 41/00 370/389 |
| 2007/0239889 A1 * | 10/2007 | Mochida | ................. | H04L 69/16 709/237 |
| 2008/0037420 A1 * | 2/2008 | Tang | ..................... | H04L 1/1607 370/229 |
| 2013/0223217 A1 * | 8/2013 | Turner | ............. | H04W 28/0273 370/231 |
| 2014/0108603 A1 * | 4/2014 | Mohr | ..................... | H04L 69/161 709/217 |
| 2014/0281018 A1 * | 9/2014 | Waclawsky | ........... | H04L 47/193 709/235 |
| 2014/0289381 A1 * | 9/2014 | Morton | ............... | H04L 41/5025 709/221 |
| 2015/0055482 A1 * | 2/2015 | Larson | ..................... | H04L 1/08 370/242 |
| 2015/0067819 A1 * | 3/2015 | Shribman | ............... | H04L 67/06 726/12 |
| 2015/0117200 A1 * | 4/2015 | Patel | ..................... | H04L 47/27 370/235 |
| 2015/0359016 A1 * | 12/2015 | Barany | ................ | H04W 76/10 709/224 |

(Continued)

*Primary Examiner* — Kevin T Bates
*Assistant Examiner* — Ronak Patel
(74) *Attorney, Agent, or Firm* — Merchant & Gould P.C.

(57) ABSTRACT

Methods and systems are disclosed wherein TCP may approximate Reliable Transport Protocol (RTP) or UDP delivery for real-time video/data conferencing applications that have long RTT connections.

20 Claims, 9 Drawing Sheets

(56) References Cited

U.S. PATENT DOCUMENTS

2016/0094608 A1* 3/2016 Sundararajan ...... H04L 65/4084 709/219
2017/0013065 A1* 1/2017 Ho ...................... H04L 43/0829

* cited by examiner

TIMELY DELIVERY OF REAL-TIME MEDIA PROBLEM WHEN TCP MUST BE USED

TECHNICAL FIELD

The present disclosure relates generally to the timely delivery of real-time data packets across a network, specifically, the timely delivery of real-time data packets across a network requiring a forced Transmission Control Protocol (TCP) connection.

BACKGROUND

In applications, such as video/data conferencing applications employing Voice over IP (VoIP), the timely delivery of real-time media packets may be valued above reliability levels provided via retransmission of non-received packets. Retransmission of packets not received by a receiving network device is provided in implementations of TCP. One approach to this issue is to use User Datagram Protocol (UDP) instead of TCP for the delivery of real-time media. However, many networks employ firewalls (or other middleboxes) that block the usage of UDP ports. Thus, a real-time video/data conferencing application may be forced to use only TCP.

The forced usage of TCP for real-time video/data conferencing applications results in the retransmission of each real-time media packet dropped between a transmitting network device and a receiving network device. Each retransmission results in a minimum delay of one round trip time (RTT). Such delays are unacceptable to provide the performance desired by real-time video/data conferencing applications as the RTTs may be quite long relative to the nominal media packet inter-departure times.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
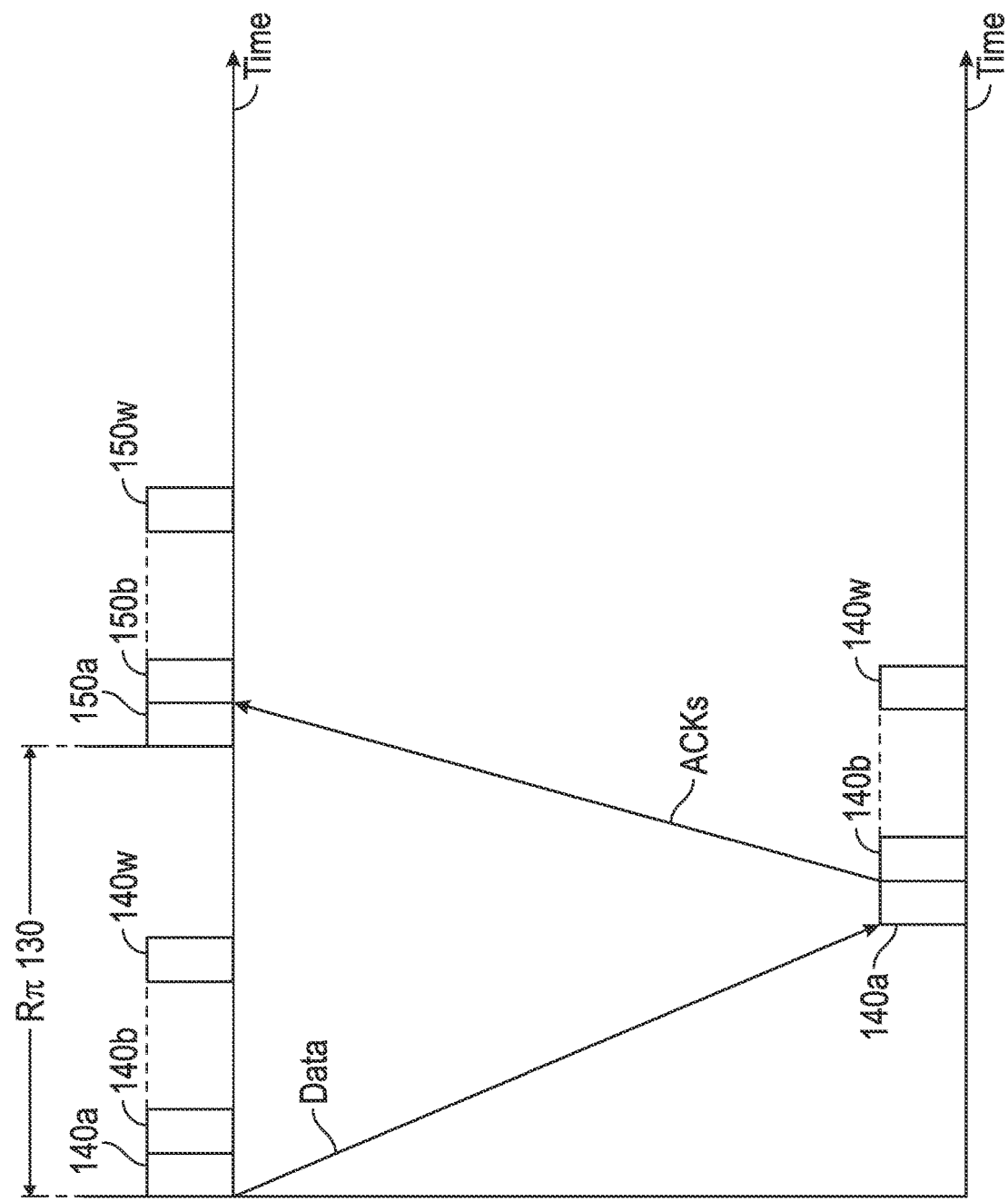
FIG. 1 illustrates a sample TCP Window Flow Control.
Figure 1:
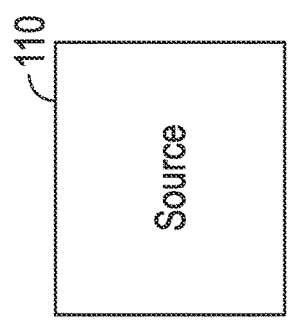
Figure 1:
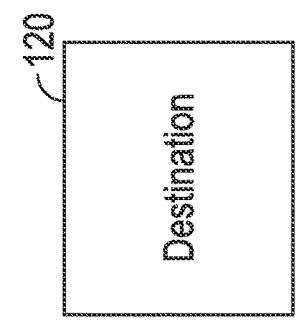

Methods and systems are disclosed which can perform embodiments for of transmitting data from a first network device comprising first establishing a first plurality of TCP sessions in a rotational order for sending a data stream from the first network device to a second network device. Next, each consecutive data packet in the data stream may be transmitted on a TCP session next in the rotational order from a TCP immediately previously used in the rotational order to transmit a data packet in the data stream. It may then be detected that a first data packet in the data stream was lost during transmission. This detection may force transmission of clearing packets on a first TCP session of the first plurality of TCP sessions, wherein the first TCP session is responsible for transmitting the first data packet in the data stream. The first TCP session of the first plurality of TCP sessions may then be designated as non-operational until an acknowledgement of transmission of the first data packet in the data stream is received.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

To achieve embodiments of the present disclosure, the effects of TCP Head-of-Line (HOL) blocking may be overcome. In contrast to UDP which transmits a given real-time media packet in one or more UDP packets, TCP considers the data provided to it as an ordered series of bits (typically presented to the TCP socket interface in bytes). When a real-time media packet must be sent via TCP, most application designers will instruct the TCP socket to send all the data presented to it immediately—resulting in the real-time media packet being sent in one or more TCP packets on the wire. In other words, the only way that newer real-time media packets in a data flow can be delivered to a particular TCP socket at the receiver in the presence of older lost prior packets is for TCP to re-transmit the older lost packets prior to transmission of the newer packets.

With TCP Head-of-Line (HOL) blocking, when data packets are lost on a particular TCP socket, that particular TCP socket ought not to be used to send any immediately subsequent packets. This is due to the newer subsequent packets being delayed by the retransmission process of the older lost data packets. Embodiments of the present disclosure provide an application layer solution employing multiple TCP connections to sense when a particular TCP socket experiences a packet loss and to discontinue using that particular TCP socket until the retransmission procedure has completed. Embodiments described herein may also result in the avoidance of TCP stalls on a particular TCP carrying real-time data.

FIG. 1 illustrates a sample TCP Window Flow Control. In this example, TCP may be employing a cumulative acknowledgement (ACK) protocol. A TCP data flow may be provided by a source, such as network device 110. In some embodiments, network device 110 may be a device running real-time video/data conferencing applications. The real-time video/data conferencing applications may be operating a real-time connection between a user at network device 110 and a user at a destination device, such as network device 120. RTT 130 is illustrative of the sum of the transit time required for a data packet, such as data packet 140a and the transmit time required for its ACK, such as packet 150a. We note that the ACK from network device 120 to network device 110 need not be its own separate packet (as depicted), but rather "piggybacked" on another data packet (not shown) that was traversing in the 120 to 110 direction as allowed by the TCP protocol.

For example, data packet 140a may be transmitted as the first data packet of a TCP data flow. Data packet 140a may be received at network device 120. Network device 120 may subsequently transmit an ACK 150a to network device 110 that indicates that data packet 140a was successfully received by network device 120. This procedure is repeated for each of data packet 140b . . . 140w. In other words, w may be determined as the number of data packets transmitted during RTT 130. Here, a lost data packet may be detected by the absence of its respective ACK, such as any of ACK 150a, 150b . . . 150w.

Embodiments described above and throughout this disclosure may be implemented on a network topology. The network topology may exist in a networking environment. For example, a networking environment may be any type of system that transmits data packets over a network. As an example, a networking environment may be an environment enabled to provide voice communications, and video and data services.

A networking environment may be based on a bi-directional transfer of packet based service, such as Internet Protocol (IP) traffic, between any number of network devices. A networking environment may further include a plurality of gateways (not shown), for example, but not limited to cable modems, routers, switches, set top boxes, and computers. A networking environment may include any combination of wide area networks (WANs), local area networks (LANs), or other networks suitable for packet-type communications, such as Internet communications.

A networking environment may be designed to transmit a stream of data packets from one network device to other network devices. A networking environment may comprise any number of network devices both inside and outside the confines of a particular virtual network or fabric. Network devices may be routers, bridges, switches, fabric edge nodes, or other network devices capable of receiving and transmitting a TCP data stream from a source network device 110 to a destination network device 120. Specifically, in embodiments of the present disclosure any of the described network devices may operate the disclosed embodiments of the present disclosure. Network devices generally are discussed in further detail in regards to FIG. 8.

Figure 2:
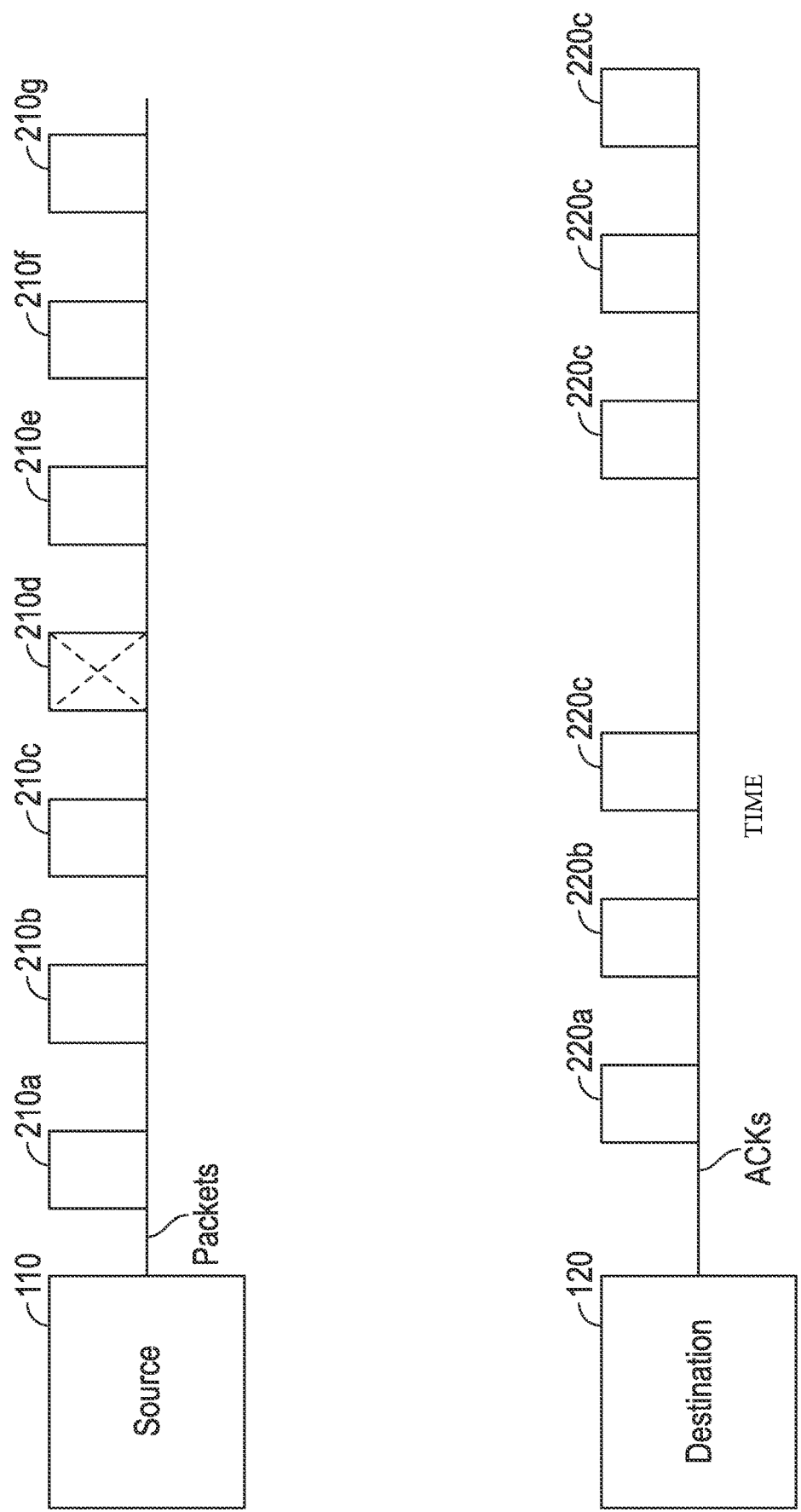
FIG. 2 illustrates sample embodiments of HOL blocking.

FIG. 2 illustrates sample embodiments of HOL blocking. In this example, data packets 210a, 210b, 210c, 210d, 210e, 210f, and 210g may be part of a TCP data flow travelling from network device 110 to network device 120. Here, ACK 220a, ACK 220b, and ACK 220c are were successfully sent to network device 110 after transmission of data packet 210a, data packet 210b, and data packet 210c respectively. On the other hand, data packet 210d may have been lost during transmission between network device 110 and network device 120. In some embodiments, it may be assumed that such a packet loss indicates network congestion.

In response to not receiving data packet 210d, network device 120 may continue to send duplicate ACKs corresponding to the last successfully received data packet. In this case, ACK 220c may be duplicated a number of times by network device 120 as data packet 210c was the last successfully transmitted packet. This duplication of ACK 220c may serve as an indication to network device 110 that packet loss has occurred after data packet 210c. In some embodiments, network device 110 may determine that packet loss has occurred after a retransmission timeouts (RTO) timer expires. In standard TCP embodiments, subsequent data packets 210e, 210f, and 210g will not be released to the application until data packet 210d becomes visible to the TCP layer of network device 120.

Figure 3:
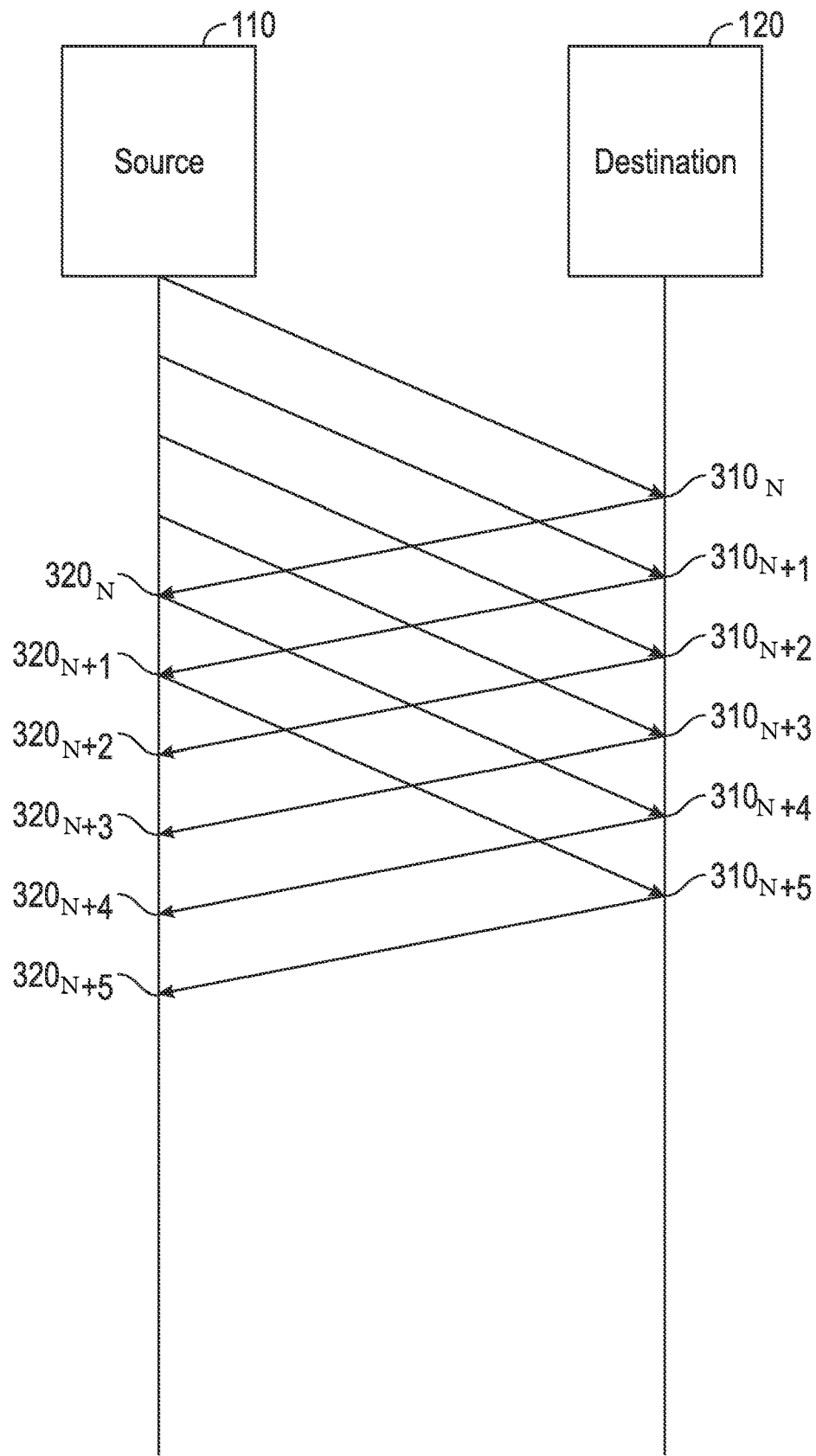
FIG. 3 illustrates sample embodiments of real-time video/data conferencing application operating over TCP.

FIG. 3 illustrates sample embodiments of real-time video/data conferencing application operating over TCP. In this example, the TCP data stream may be operating through a single TCP socket. The TCP data stream may have data packets of 60 ms, a RTT of 240 ms, and may be experiencing no loss.

Network device 110 may transmit data packet 310n to network device 120. When data packet 310n is received by network device 120, data packet 310n may be released to the application layer of network device 120. Network device 120 may subsequently transmit an ACK 320n to network device 110. When the ACK is received at network device 110, within the TCP socket (invisible to the application layer) data packet 310n may be released from a TCP send queue.

In the no loss case of the present example, this process is repeated for each of data packets 310n, 310n+1, 310n+2, 310n+3, 310n+4, and 310n+5 and respective ACKs 320n, 320n+1, 320n+2, 320n+3, 320n+4, and 320n+5 as they are successfully transmitted between network device 110 and network device 120. In this case described in FIG. 3, the data packets may be delivered with virtually identical timeliness as employing RTP or UDP (assuming the sending application requested the sending TCP socket to release to the wire all the data on its send queue).

Figure 4:
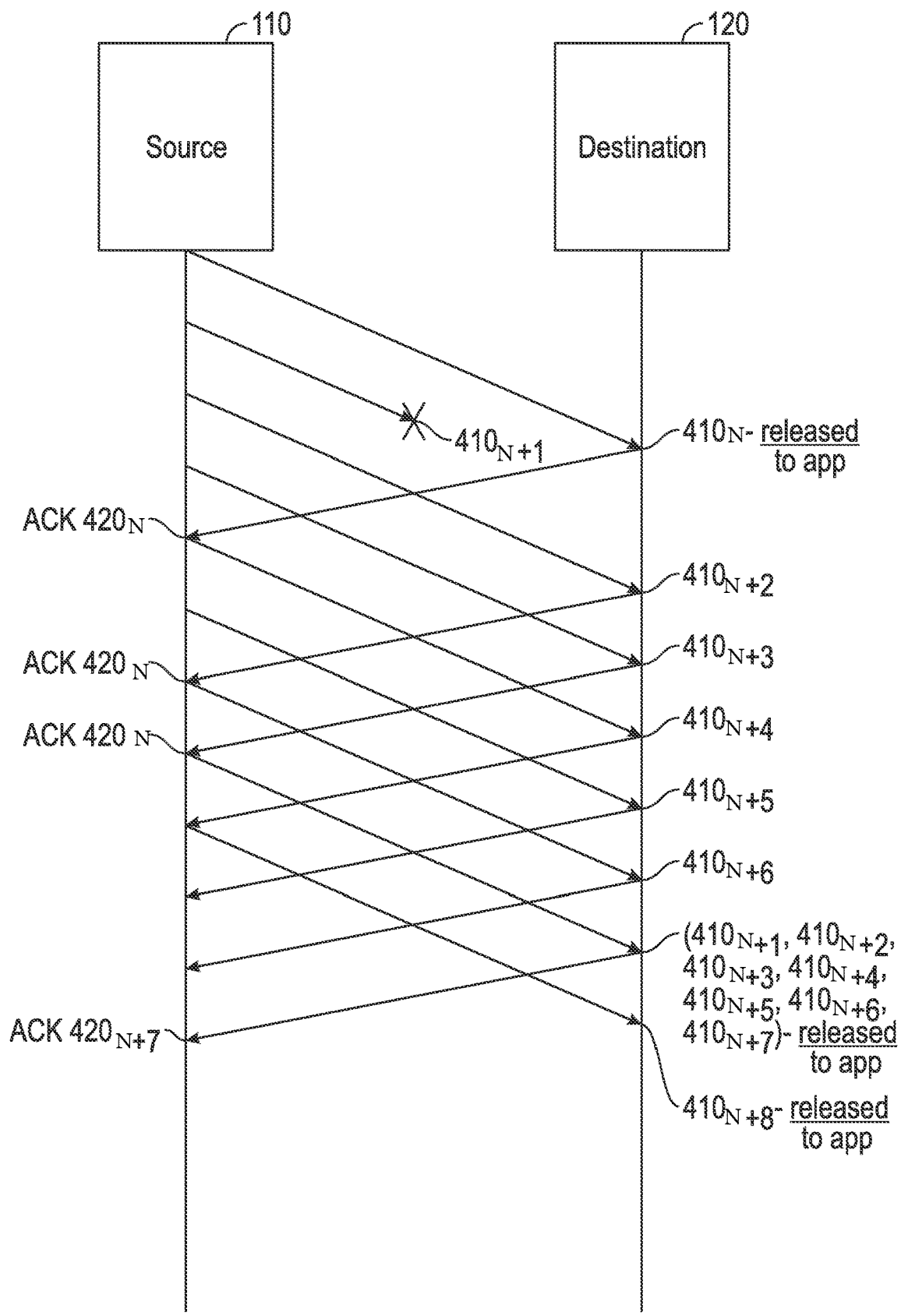
FIG. 4 illustrates sample embodiments of real-time video/data conferencing application operating over TCP.

FIG. 4 illustrates sample embodiments of real-time video/data conferencing application operating over TCP. In this example, the TCP data stream may be operating through a single TCP socket. The TCP data stream may have data packets of 60 ms, a RTT of 240 ms, and may be experiencing congestion.

Network device 110 may transmit data packet 410n to network device 120. When data packet 410n is received by network device 120, data packet 410n may be released to the application layer of network device 120. Network device 120 may subsequently transmit an ACK 420n to network device 110. When the ACK is received at network device 110, within the TCP socket (invisible to the application layer) data packet 410n may be released from a TCP send queue.

Next, network device 110 may transmit data packet 410n+1 to network device 120. Data packet 410n+1 may be lost due to congestion prior to reaching network device 120. Network device 110 may continue by transmitting data packet 410n+2 to network device 120. When data packet 410n+2 is received by network device 120, data packet 410n+2 may not be released to the application layer of network device 120. Network device 120 may subsequently re-transmit the previous ACK to network device 110.

When a re-transmitted ACK is received at network device 110 multiple times (in this example, three times correlating to data packet 410n while transmitting data packets 410n, 410n+2 and 410n+3 as this is standard TCP default operation), network device 110 may determine that data packet 410n+1 was never received. By the time network device 110 determines that data packet 410n+1 was never received, data packets 410n+2, 410n+3, 410n+4, 410n+5, 410n+6 have all been transmitted to network device 120 and have not been released to the application layer. Thus, network device 110 may resend each of data packets 410n+1, 410n+2, 410n+3, 410n+4, 410n+5, and 410n+6 along with data packet 410n+7 (in this example). It should be noted that there are some TCP options that would "negatively acknowledge" (NACK) data packet 410n+1 as soon as data packet 410n+2 was received which would inform network device 110 sooner than the standard default operation shown; however the fundamental problem remains—network device 110 cannot know less than a RTT that such a packet loss occurred.

As soon as network device 120 receives the retransmission of data packets 410n+1, each of data packets received after it (410n+1, 410n+2, 410n+3, 410n+4, 410n+5, 410n+6, and 410n+7 in this example) may be released to the application layer in a burst. For a real-time video/data conferencing application, this may result in no data packets being released to the application layer for 420 ms as a result of this HOL blocking. Network device 110 may receive the ACK message corresponding to data packet 410n+7 and subsequently release each of data packets 410n+1, 410n+2, 410n+3, 410n+4, 410n+5, 410n+6, and 410n+7 from the send queue.

In some embodiments, a form of selective acknowledgement TCP option may be enabled. This option may result in certain of the already received packets to not be retransmitted. For example, data packets 410n+2 and 410n+3 may be indicated by the selective ACK message and may not be retransmitted.

Figure 5:
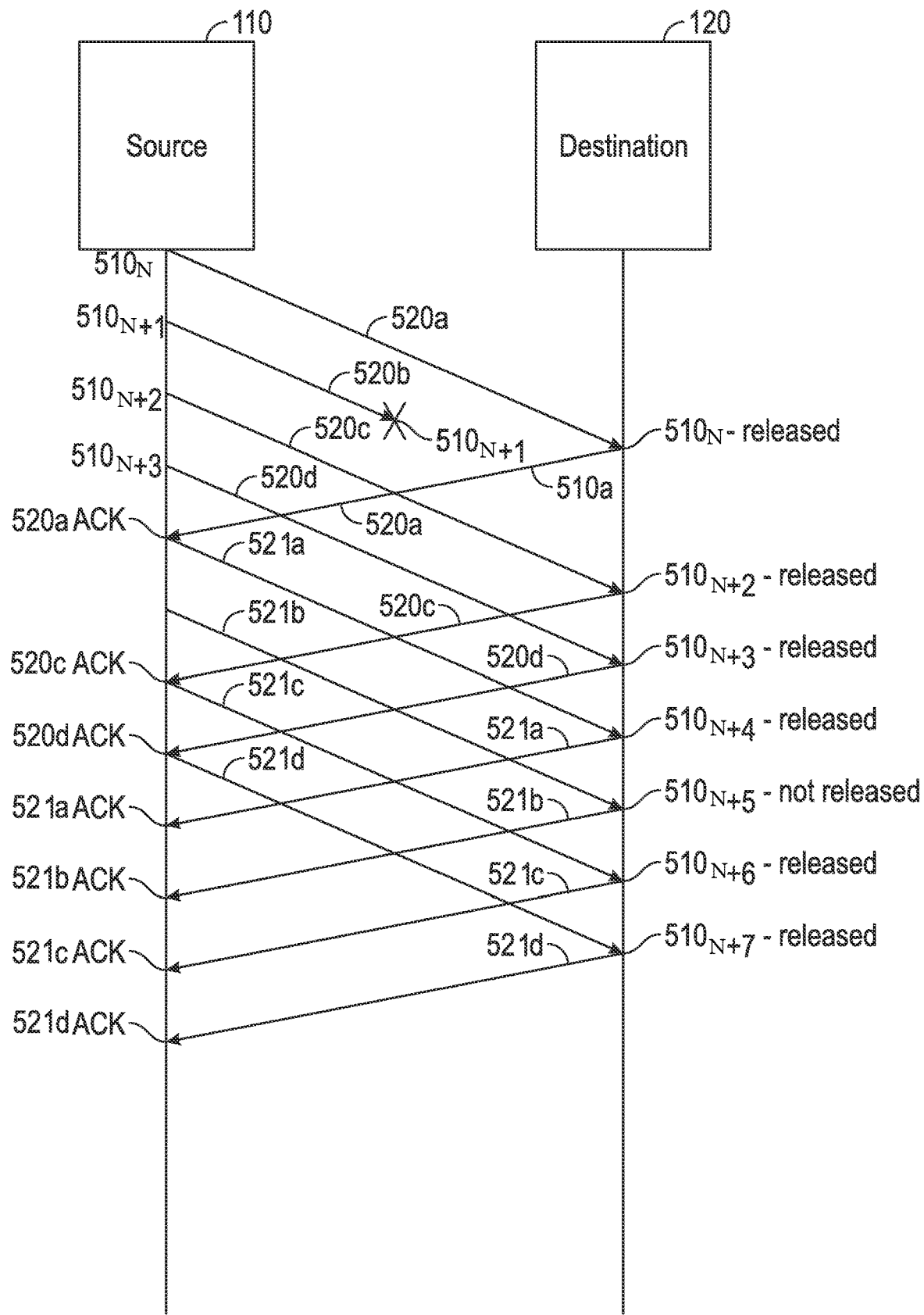
FIG. 5 illustrates real-time video/data conferencing applications operating over TCP embodiments of the present disclosure.

FIG. 5 illustrates real-time video/data conferencing applications operating over TCP embodiments of the present disclosure. In this example, four TCP sockets may be used in a rotation until loss is noted by a sender. The TCP data stream may have data packets of 60 ms, a RTT of 240 ms, and may be experiencing congestion.

Network device 110 may transmit data packet 510n to network device 120 using a first TCP socket 520a. When data packet 510n is received by network device 120, data packet 510n may be released to the application layer of network device 120. Network device 120 may subsequently transmit an ACK using TCP socket 520a to network device 110.

Next, network device 110 may transmit data packet 510n+1 to network device 120 using a second TCP socket 520b. Data packet 510n+1 may be lost due to congestion prior to reaching network device 120. Network device 110 may continue by transmitting data packet 510n+2 to network device 120 using a third TCP socket 520c. When data packet 510n+2 is received by network device 120, data packet 510n+2 may be released to the application layer of network device 120. Similarly, network device 110 may continue by transmitting data packet 510n+3 to network device 120 using a fourth TCP socket 520d. When data packet 510n+3 is received by network device 120, data packet 510n+3 may be released to the application layer of network device 120.

In some embodiments of the present disclosure, application notification may be provided to indicate that data packet 510n+1 was not received. Subsequent to such application notification, network device can force a number of additional packets through TCP socket 520b. This will result in the generation of a corresponding number of ACK messages. Furthermore, use of TCP socket 520b may be discontinued until it is operational again. In some embodiments, it may be determined that TCP socket 520b is operational when a send window for TCP socket 520b reaches its maximum (providing an indication visible to the sending application that the TCP socket has no unacknowledged data in it).

While TCP socket 520b is not operational, the other active TCP sockets may still be used in rotation to ensure continued real-time data delivery of the subsequent data packets. In the example, data packets 510n+1 and 510n+5 are the only packets that may appear lost to a rendering application. The rotation of the TCP sockets may create isolated data packet losses and avoid bulk retransmission delays. While four TCP sockets are shown in this example, it should be understood that any number of TCP sockets may be employed according to embodiments of the present disclosure.

Embodiments of the present disclosure may employ a predetermined number of TCP sessions (sockets) to send data packets across a network. Each data packet may be assigned a packet sequence number. Data packets with consecutive packet sequence numbers may be transmitted on different TCP sessions via a rotation of the operational TCP sessions. An application running at a destination network device may acknowledge all received packet sequence numbers to a source network device.

In embodiments of the present disclosure, until a loss is detected by the source network device all TCP sessions may be kept in an operational state. A loss may be detected when the source network device gets an ACK for packet sequence number n+x when it is expecting an ACK for packet sequence number n.

When the source network device receives an ACK for packet sequence number n+x and x>1 and the expected ACK for packet sequence number n was not received, the following described steps may be performed. First, a number of packets may be sent to clear the TCP session used for packet sequence number n. This may force retransmission of packet sequence number n. In some embodiments, the forced packets may be NO-OP packets. Next, the TCP session may be designated as non-operational (not in the rotation of used TCP sessions) until the ACK for packet sequence number n is returned. Finally, if x>1 (which would indicate that more than one consecutive packet has been lost), the previous two steps may be repeated for the corresponding TCP sessions.

Many real-time video/data conferencing applications may be constrained by being required to send data using TCP, while the applications require the timeliness of RTP or UTP. Embodiments of the present disclosure employ multiple TCP sessions to handle these constraints. The number of TCP sessions to use may be determined as a function of the duration of each data packet (60 ms in the above examples). RTT (240 ms in the above examples) may also be factored in the TCP number determination. It should be understood that the TCP sessions may be used by application traffic other than the data flow used by the real-time video/data conferencing application. For example, TCP roster updates containing small packets may be sent over the rotating TCP sessions.

Figure 6:
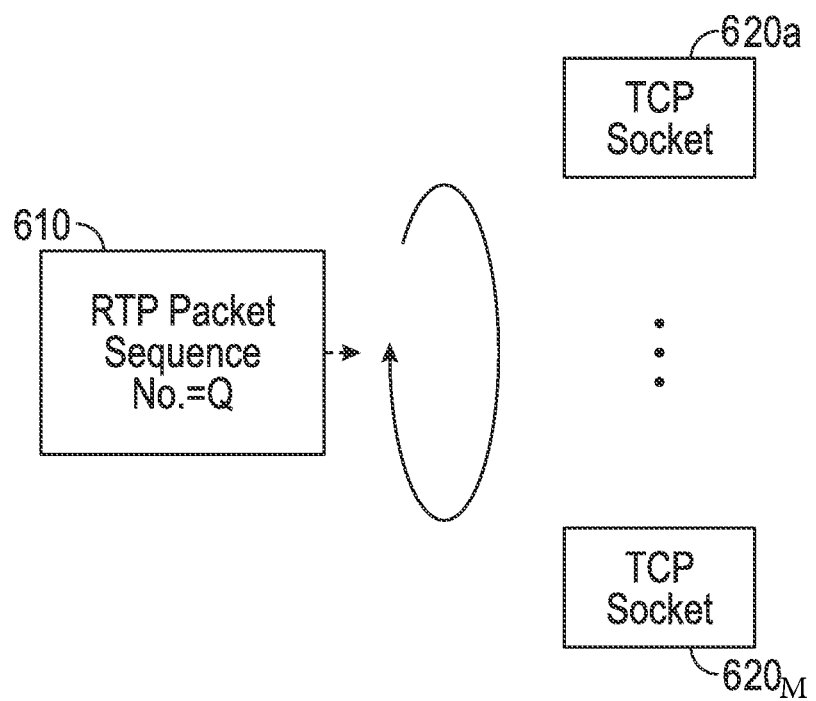
FIG. 6 illustrates embodiments of TCP socket (session) rotation.

FIG. 6 illustrates embodiments of TCP socket (session) rotation. When new RTP packets are created, such as RTP packet 610 (created with a packet sequence number of Q), they may be transmitted through a number of rotating operational TCP sockets, such as TCP sockets 620a . . .

620*m*. In some embodiments of the present disclosure, the TCP sockets may be rotated in a "round-robin" fashion.

In some embodiments of the present disclosure, when new RTP packets (media/data packet) are to be sent to far-end (for example, an IP telephony network device), the transmission may occur by rotating the sending of the packets through the operational near-end to far-end TCP sockets in a round-robin fashion. The far-end may send ACKs back to the near-end for each received packet by packet sequence number. These ACKs may be non-TCP application layer ACKs. The far-end ACKs may be sent through any of the operational far-end to near-end TCP sockets regardless of the rotation.

When a gap may be detected between consecutive packet sequence numbers at the near-end, the TCP socket associated with the missing packet sequence number may be made non-operational. In some embodiments, if the TCP socket is the only operational TCP socket, the TCP may remain operational. After making the TCP socket associated with the missing packet sequence number non-operational, action may immediately begin on returning the TCP socket to an operational state. For example, a small NO-OP packet may be transmitted to the far-end (on the non-operational TCP socket) to force an ACK response. When the NO-OP packet is received by the application from any of the far-end to near-end TCP sockets regardless of the rotation, the respective TCP socket may be designated as operational for the near-end to far-end direction.

Figure 7:
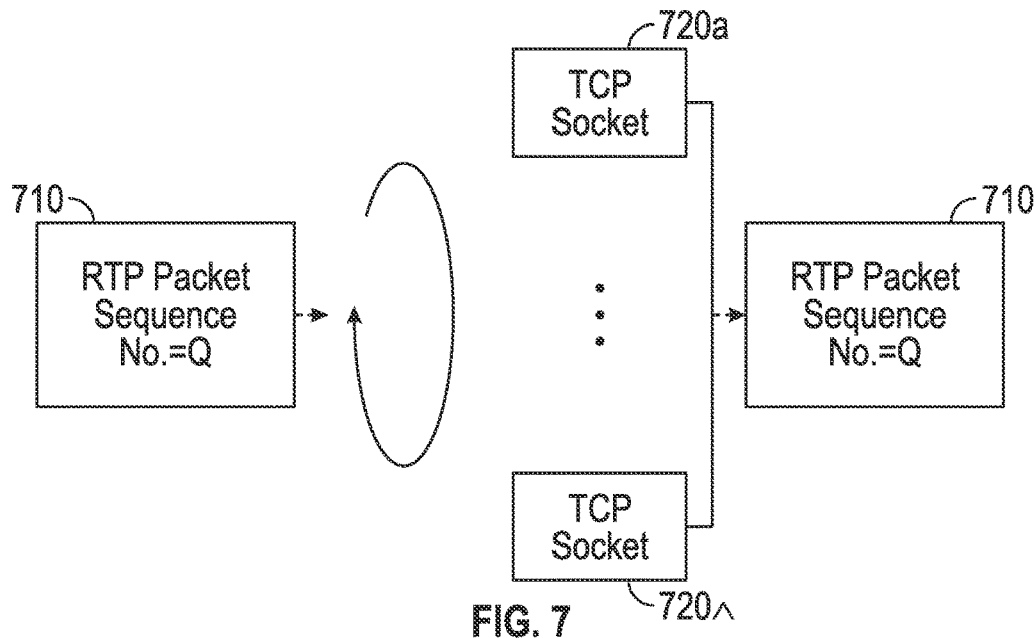
FIG. 7 illustrates embodiments of TCP socket (session) rotation.

FIG. 7 illustrates embodiments of TCP socket (session) rotation. When new RTP packets are created, such as RTP packet 710 (created with a packet sequence number of Q), they may be transmitted through one of a number of rotating operational TCP sockets, such as TCP sockets 720*a* . . . 720*n*. The use of the multiple TCP sockets is primarily to overcome HOL blocking and do not necessarily serve to obtain more bandwidth for the data flow. Embodiments of the present disclosure may not require any changes to normal TCP operation. Instead, a small number of additional TCP sockets may be employed. Furthermore, use of platform-dependent TCP shim protocols is not required to overcome HOL blocking. Also, embodiments of the present disclosure may require no use of non-standard, user-space TCP stacks (many of which may be platform dependent).

Embodiments of the present invention may provide delay performance identical to UDP while operating under TCP constraints. Embodiments may operate similar to existing TCP implementations in that all data packets may eventually reach the destination network device. When transmitting real-time video/data conferencing packets, embodiments of the present disclosure may temporarily operate with complete audio duplication when catastrophic losses brings a system down to a single operational TCP socket. For example, the video packet stream may be frozen, while twice as much audio data is provided. In some embodiments, the audio data may be transmitted using non-operational TCP sockets.

According to embodiments of the present disclosure, the rotating TCP sockets may comprise duplex byte streams. In other words, the TCP sockets may be capable of sending data packets in both directions. Logic may be provided at an application layer to designate and track the operational status for each direction of each TCP socket. For example, a particular TCP socket may be operational from the near-end to the far-end direction, but non-operational from the far-end to the near-end direction.

Embodiments of the present disclosure may determine operational status of TCP sockets after initially opening N TCP sockets. For each given TCP socket direction, test data packets may be transmitted to test availability. First, each TCP socket may be originally designated as operational. Next, it may be assumed that all of the TCP sockets are operational until one of the packets sent receives an ACK in response indicating that a packet sequence number had been detected. During continued operation, embodiments of the present disclosure may notate any packet sequence numbers that do not appear in consecutive order. Once a packet loss is detecting, embodiments described above may be employed to handle continued data transmission.

Figure 8:
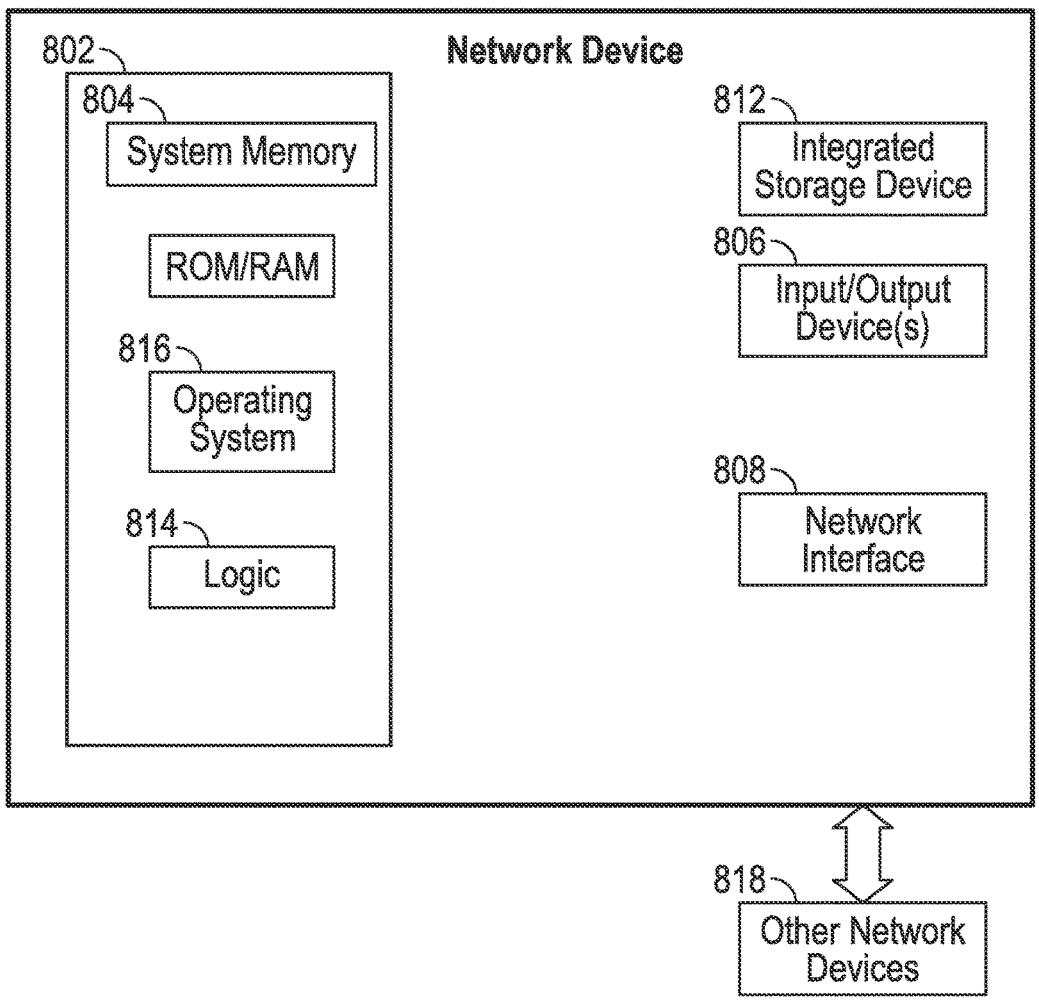
FIG. 8 shows a network device (such as network device 110) in greater detail.

FIG. 8 shows a network device (such as network device 110) in greater detail. A network device may include a processing device 802, a memory 804, input/output (I/O) devices 806, and a network interface 808, each of which may be communicatively coupled via a local interface (not shown). Processing device 802 may be a hardware device for executing software, particularly that which is stored in memory 804. Processing device 802 may be any custom made or commercially available processor, a central processing unit (CPU), an auxiliary processor among several processors, a semiconductor-based microprocessor (in the form of a microchip or chip set), a microprocessor, or generally any device for executing software instructions. Software executed by processing device 802 may include software at least capable of operating described embodiments of the present disclosure.

Network interface 808 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

I/O devices 806 may include input devices, for example but not limited to, a keyboard, mouse, scanner, microphone, etc. Furthermore, the I/O devices 206 may also include output devices, for example but not limited to, a printer, display, etc.

The local interface may be, for example but not limited to, one or more buses or other wired or wireless connections. The local interface may have additional elements, which are omitted for simplicity, such as controllers, buffers (caches), drivers, repeaters, and receivers, to enable communications. Further, local interface 810 may include address, control, and/or data connections to enable appropriate communications among the aforementioned components and provides the interface to communicate with a network controller, a host tracking database, a fabric edge router, or any number of other network devices in a networking environment.

In some embodiments, a network device may further be configured with an integrated storage device 812 coupled to local interface 810. Storage device 812 may be configured to buffer a plurality of data packets. One or more such buffers may be dedicated buffers for storing captured packets. In some embodiments, storage device 812 may be externally coupled to a content server (not shown).

Memory 804 may include a suitable operating system (O/S) 814. Operating system 814 essentially may control the execution of other computer programs, such as scheduling, input-output control, file and data management, memory management, and communication control and related services. Logic 816 may include executable code to send service requests to the local system, the remote system, a fabric edge router, or any number of other network devices in a networking environment.

Memory 804 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 804 may incorporate electronic, magnetic, optical, semi-conductive, and/or other types of storage media. Note that memory 804 may have a distributed architecture, where various components are situated remotely from one another, which can be accessed by the processing device 802.

The software in memory 804 may include one or more separate programs, each of which comprises an ordered listing of executable instructions for implementing logical functions. In the embodiment shown in FIG. 8, the software in memory 804 may include operating system 814 and logic 816, as explained above. Functionality of logic 816 may be implemented using a single module, or distributed among a plurality of modules.

When logic 816 is in operation, processing device 802 may be configured to execute logic 816 stored within memory 804, to communicate data to and from memory 804, and to generally control operations of logic 816. Logic 816 and O/S 814, in whole or in part, but typically the latter, are read by processing device 802, perhaps buffered within processing device 802, and then executed.

The network controller may include a communication interface suitable for enabling communication (e.g., TCP/IP) of data packets with other network devices 818 of a network environment. For instance, the communication interface may be of a type suitable for communication over an IP network, a coaxial cable network, an HFC network, and/or wireless network, among others.

Figure 9:
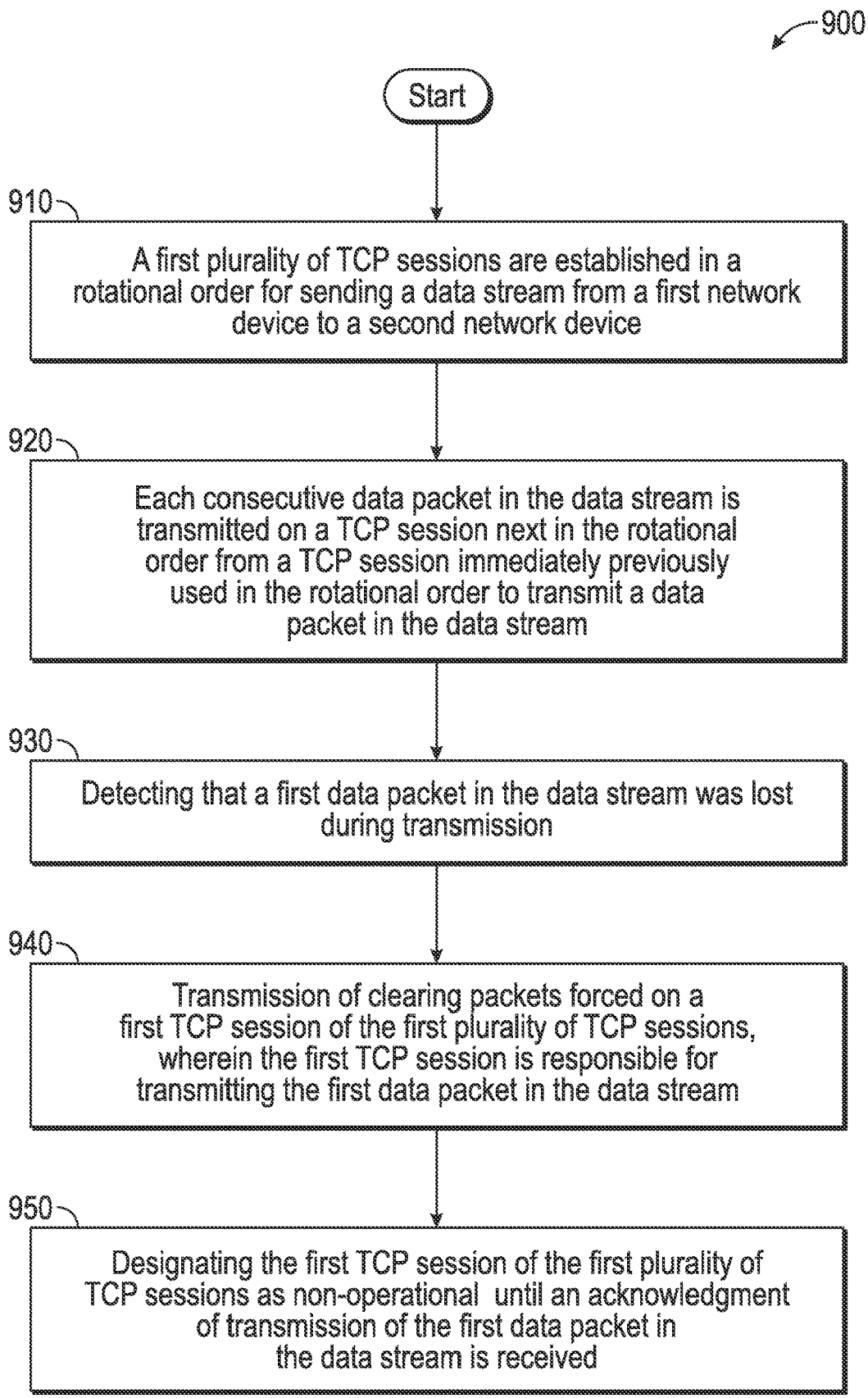
FIG. 9 is a flow chart illustrating embodiments of the present disclosure.

Having described various components of certain embodiments of the present disclosure, a method 900 implemented by one or more network devices employed on a network environment will now be described with reference to FIG. 9. Method 900 may begin at step 910 where a first plurality of TCP sessions may be established in a rotational order for sending a data stream from a first network device to a second network device. In some embodiments of the present disclosure, the rotational order is round-robin. Any suitable rotation order may be employed with embodiments of the present disclosure. In some embodiments of the present disclosure, the rotational order of the first plurality of TCP sessions is managed at an application layer. The data stream may be forced into TCP transmission by one or more network constraints. For example, the data stream may originate from a real-time video/data conferencing application that requires timeliness identical to that provided by UDP In some embodiments of the present disclosure, only TCP sessions designated as operational may be included in the rotational order. In some embodiments of the present disclosure, the number of TCP sessions included in the rotational order is limited to a predetermined number. The predetermined number may be based at least in part on a duration of each data packet in the data stream and an associated data packet round trip time (RTT).

Method 900 may proceed to step 920. At step 920, each consecutive data packet in the data stream may be transmitted on a TCP session next in the rotational order from a TCP immediately previously used in the rotational order to transmit a data packet in the data stream. In some embodiments of the present disclosure, acknowledgements may be received for each data packet in the data stream successfully transmitted. The acknowledgments may comprise at least a packet sequence number associated with each data packet for which receipt is acknowledged.

Subsequently, method 900 may proceed to step 930 where it may be detected that a first data packet in the data stream was lost during transmission. In some embodiments of the present disclosure, detecting that a first data packet in the data stream was lost during transmission may comprise receiving an acknowledgement comprising a packet sequence number greater than an expected packet sequence number.

Next, method 900 may proceed to step 940. At step 940, transmission of clearing packets may be forced on a first TCP session of the first plurality of TCP sessions, wherein the first TCP session is responsible for transmitting the first data packet in the data stream. In some embodiments of the present disclosure, the clearing packets may be NO-OP packets. Subsequently at step 950, the first TCP session of the first plurality of TCP sessions may be designated as non-operational until an acknowledgement of transmission of the first data packet in the data stream is received. Accordingly, when an acknowledgement of transmission of the first data packet in the data stream is received the first TCP session of the first plurality of TCP sessions may be re-designated as operational.

Figure 10:
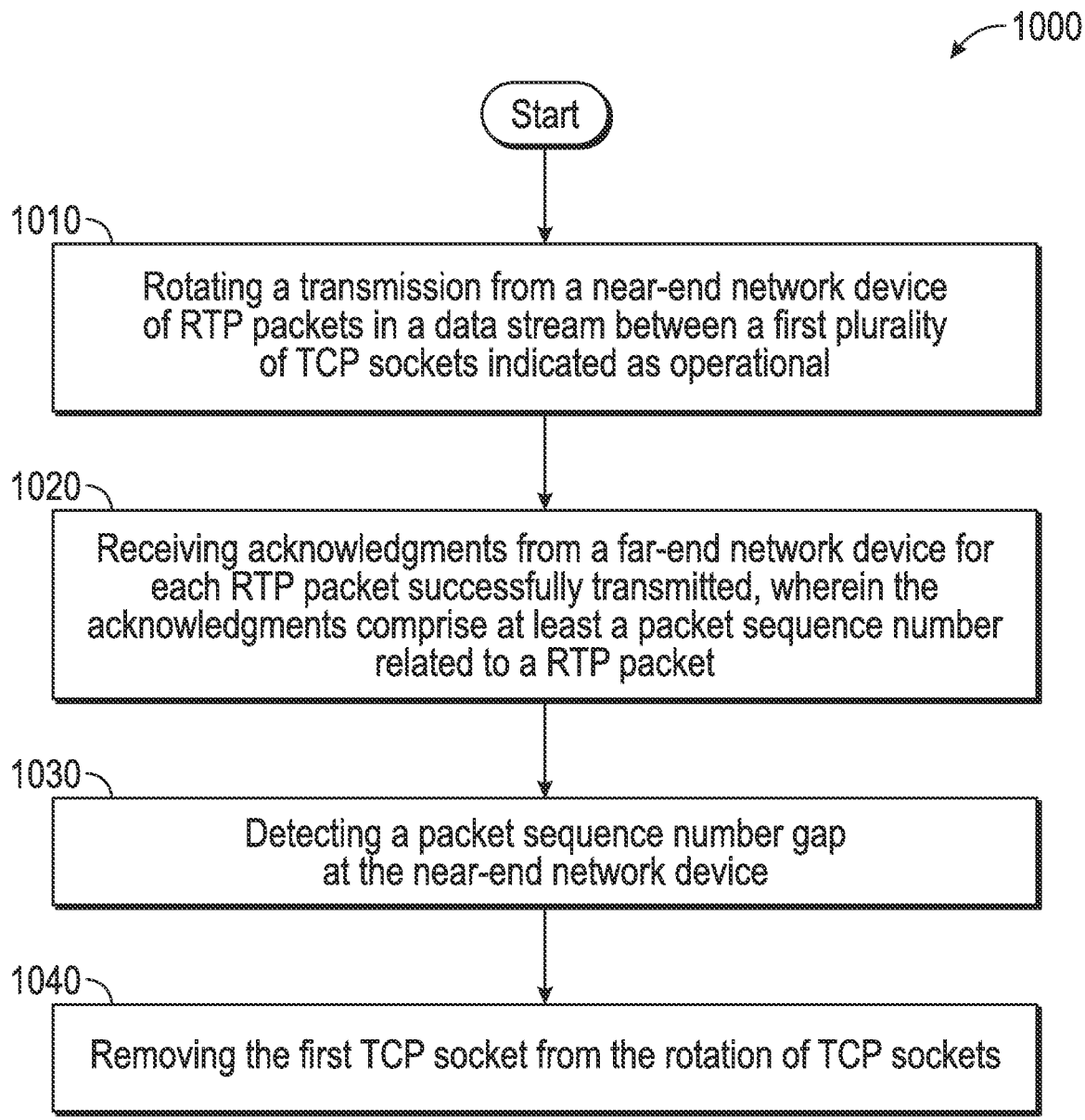
FIG. 10 is a flow chart illustrating embodiments of the present disclosure.

Having described various components of certain embodiments of the present disclosure, a method 1000 implemented by one or more network devices employed on a network environment will now be described with reference to FIG. 10. Method 1000 may begin at step 1010 where a transmission from a near-end network device of RTP packets in a data stream may be rotated between a first plurality of TCP sockets indicated as operational.

Next, method 1000 may proceed to step 1020. At step 1020, acknowledgements from a far-end network device may be received for each RTP packet successfully transmitted, wherein the acknowledgements comprise at least a packet sequence number related to a RTP packet. Subsequently, method 1000 may proceed to step 1030 where a packet sequence number gap may be detected at the near-end network device.

Subsequently, method 1000 may proceed to step 1040 where a first TCP socket may be removed from the rotation of TCP sockets. In some embodiments of the present disclosure, the first TCP socket may be responsible for attempted transmission of a data packet corresponding to the packet sequence number gap. To return the first TCP socket to the operational rotation a plurality of packets may be transmitted across the first TCP socket to force an acknowledgment of one of the plurality of packets. In some embodiments of the present disclosure, the plurality of packets comprises packets of a size smaller than a size of the data packet corresponding to the packet sequence number gap.

transmitting duplicate audio data packets and no video data packets if the first TCP socket is a sole remaining operational TCP socket in the rotation.

Embodiments of the disclosure, for example, may be implemented as a computer process (method), a computing system, or as an article of manufacture, such as a non-transitory computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    establishing a first plurality of transmission control protocol (TCP) sessions for sending a data stream comprising consecutive data packets from a first network device to a second network device, wherein each of the consecutive data packets in the data stream are assigned a respective packet sequence number that is progressively larger than a packet sequence number of a previous data packet in the data stream;
    transmitting the data packets from the first network device to the second network device, wherein transmitting the data packets comprises transmitting the data packets with consecutive sequence numbers on different TCP sessions via a rotation of operational TCP sessions of the first plurality of TCP sessions wherein consecutively sequenced data packets are transmitted on different TCP sessions;
    receiving acknowledgements for each data packet in the data stream successfully transmitted, wherein the acknowledgments comprise at least a packet sequence number associated with each data packet for which receipt is acknowledged;
    detecting that a first data packet in the data stream transmitted on a first TCP session of the first plurality of TCP sessions was lost during transmission, wherein detecting that the first data packet in the data stream was lost during transmission comprises receiving an acknowledgement comprising an index that is greater than an expected packet sequence number;
    determining the first TCP session was responsible for transmitting the first data packet from the operational TCP sessions;
    forcing transmission of clearing packets on the first TCP session; and
    designating the first TCP session of the first plurality of TCP sessions as non-operational until a number of acknowledgements corresponding to the clearing packets is equal to a number of the clearing packets in a send window and an acknowledgement of transmission of the first data packet in the data stream is received.

2. The method of claim 1, wherein the rotational order is round-robin.

3. The method of claim 1, wherein the clearing packets are NO-OP packets.

4. The method of claim 1, further comprising:
    designating the first TCP session of the first plurality of TCP sessions as operational when an acknowledgement of transmission of the first data packet in the data stream is received.

5. The method of claim 4, wherein only TCP sessions designated as operational are included in the rotational order.

6. The method of claim 5, wherein a number of TCP sessions included in the rotational order is limited to a predetermined number.

7. The method of claim 1, wherein the data stream is forced into TCP transmission by one or more network constraints.

8. The method of claim 7, wherein the data stream originates from a real-time video/data conferencing application that requires timeliness identical to that provided by UDP.

9. The method of claim 6, wherein the predetermined number is based at least in part on a duration of each data packet in the data stream and an associated data packet round trip time (RTT).

10. The method of claim 1, wherein the rotational order of the first plurality of TCP sessions is managed at an application layer.

11. A system comprising:
    a memory;
    a processor capable of executing instructions stored on the memory, the instructions comprising:
        establishing a first plurality of transmission control protocol (TCP) sessions for sending a data stream comprising consecutive data packets from a first network device to a second network device, wherein each of the consecutive data packets in the data stream are assigned a respective packet sequence number that is progressively larger than a packet sequence number of a previous data packet in the data stream;

transmitting the data packets from the first network device to the second network device, wherein transmitting the data packets comprises transmitting the data packets with consecutive sequence numbers on different TCP sessions via a rotation of operational TCP sessions of the first plurality of TCP sessions wherein consecutively sequenced data packets are transmitted on different TCP sessions;

receiving acknowledgements for each data packet in the data stream successfully transmitted, wherein the acknowledgments comprise at least a packet sequence number associated with each data packet for which receipt is acknowledged;

detecting that a first data packet in the data stream transmitted on a first TCP session of the first plurality of TCP sessions was lost during transmission, wherein detecting that the first data packet in the data stream was lost during transmission comprises receiving an acknowledgement comprising an index that is greater than an expected packet sequence number;

determining the first TCP session was responsible for transmitting the first data packet from the operational TCP sessions;

forcing transmission of clearing packets on the first TCP session; and designating the first TCP session of the first plurality of TCP sessions as non-operational until a number of acknowledgements corresponding to the clearing packets is equal to a number of the clearing packets in a send window and an acknowledgement of transmission of the first data packet in the data stream is received.

12. The system of claim 11, wherein the rotational order is round-robin.

13. The system of claim 11, wherein the clearing packets are NO-OP packets.

14. The system of claim 11, wherein the instructions further comprising designating the first TCP session of the first plurality of TCP sessions as operational when an acknowledgement of transmission of the first data packet in the data stream is received.

15. The system of claim 11, wherein only TCP sessions designated as operational are included in the rotational order.

16. The system of claim 11, wherein a number of the first plurality of TCP sessions is limited to a predetermined number.

17. The system of claim 16, wherein the predetermined number is based at least in part on a duration of each data packet in the data stream and an associated data packet round trip time (RTT).

18. The system of claim 11, wherein the data stream originates from a real-time video/data conferencing application that requires timeliness identical to that provided by UDP.

19. A non-transitory computer-readable medium that stores a set of instructions which when executed perform a method comprising:

establishing a first plurality of transmission control protocol (TCP) sessions for sending a data stream comprising consecutive data packets from a first network device to a second network device, wherein each of the consecutive data packets in the data stream are assigned a respective packet sequence number that is progressively larger than a packet sequence number of a previous data packet in the data stream;

transmitting the data packets from the first network device to the second network device, wherein transmitting the data packets comprises transmitting the data packets with consecutive sequence numbers on different TCP sessions via a rotation of operational TCP sessions of the first plurality of TCP sessions wherein consecutively sequenced data packets are transmitted on different TCP sessions;

receiving acknowledgements for each data packet in the data stream successfully transmitted, wherein the acknowledgments comprise at least a packet sequence number associated with each data packet for which receipt is acknowledged;

detecting that a first data packet in the data stream transmitted on a first TCP session of the first plurality of TCP sessions was lost during transmission, wherein detecting that the first data packet in the data stream was lost during transmission comprises receiving an acknowledgement comprising an index that is greater than an expected packet sequence number;

determining the first TCP session was responsible for transmitting the first data packet from the operational TCP sessions;

forcing transmission of clearing packets on the first TCP session; and designating the first TCP session of the first plurality of TCP sessions as non-operational until a number of acknowledgements corresponding to the clearing packets is equal to a number of the clearing packets in a send window and an acknowledgement of transmission of the first data packet in the data stream is received.

20. The non-transitory medium of claim 11, wherein a number of the first plurality of TCP sessions is limited to a predetermined number, and wherein the predetermined number is based at least in part on a duration of each data packet in the data stream and an associated data packet round trip time (RTT).

* * * * *